United States Patent [19]
Ward

[11] Patent Number: 5,827,335
[45] Date of Patent: Oct. 27, 1998

[54] ENHANCED PERFORMANCE CARBURETOR SYSTEM

[75] Inventor: Darrell Ward, Sparta, N.C.

[73] Assignee: Pioneer/Eclipse Corporation, Sparta, N.C.

[21] Appl. No.: 554,450

[22] Filed: Nov. 7, 1995

[51] Int. Cl.$^6$ ...................................................... B01F 3/02
[52] U.S. Cl. ............................ 48/180.1; 48/144; 48/219; 123/328; 123/336; 261/65
[58] Field of Search ................... 48/144, 180.1, 48/219; 123/328, 336; 261/65

[56] References Cited

U.S. PATENT DOCUMENTS

| | | |
|---|---|---|
| 2,493,387 | 1/1950 | Campbell . |
| 2,831,758 | 4/1958 | Warner et al. . |
| 3,007,683 | 11/1961 | McCracken . |
| 3,231,249 | 1/1966 | Kalert, Jr. .................................. 261/65 |
| 3,410,539 | 11/1968 | Walker ...................................... 261/65 |
| 3,437,320 | 4/1969 | Walker et al. ............................. 261/65 |
| 3,738,336 | 6/1973 | Holland . |
| 3,752,141 | 8/1973 | Charron et al. ............................ 261/65 |
| 4,399,795 | 8/1983 | Brown . |
| 4,991,561 | 2/1991 | Gerassimov et al. . |
| 5,150,690 | 9/1992 | Carter et al. . |
| 5,377,646 | 1/1995 | Chasteen . |
| 5,408,978 | 4/1995 | Davis . |

*Primary Examiner*—Timothy McMahon
*Attorney, Agent, or Firm*—Saidman Design Law Group

[57] ABSTRACT

A spud end fuel metering tube in an air-fuel mixing passage in a propane carburetor for enhancing performance of the system. The fuel supplying spud end is located in a venturi throat within the mixing chamber of the carburetor. The spud end includes linearly aligned fuel supply apertures that face downstream of the airflow therethrough. This combination provides increased power and fuel economy over a wide range of RPMs and demand levels while substantially reducing undesirable pollutant emission levels. The butterfly valve of the carburetor includes apertures formed therein for permitting the engine to idle when the butterfly valve closes eliminating the necessity for other downstream ports.

23 Claims, 2 Drawing Sheets

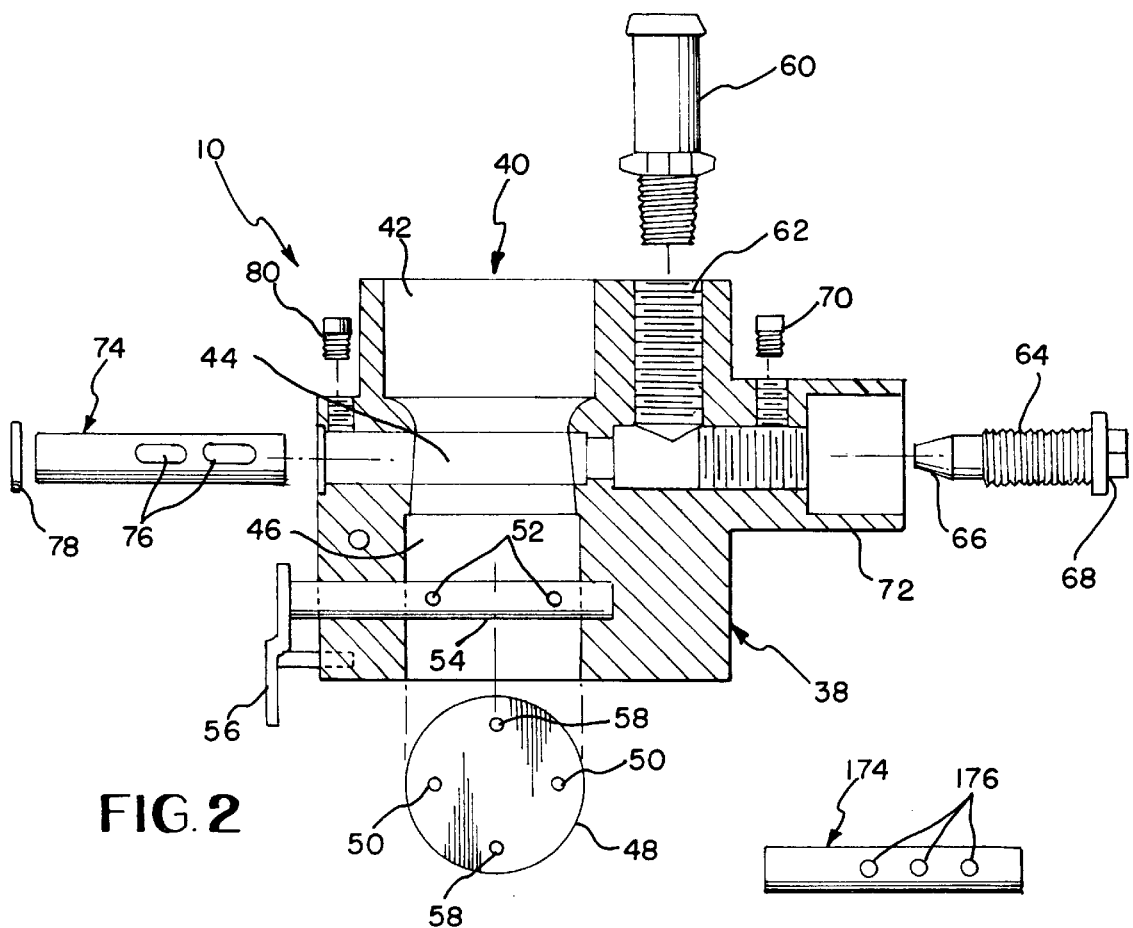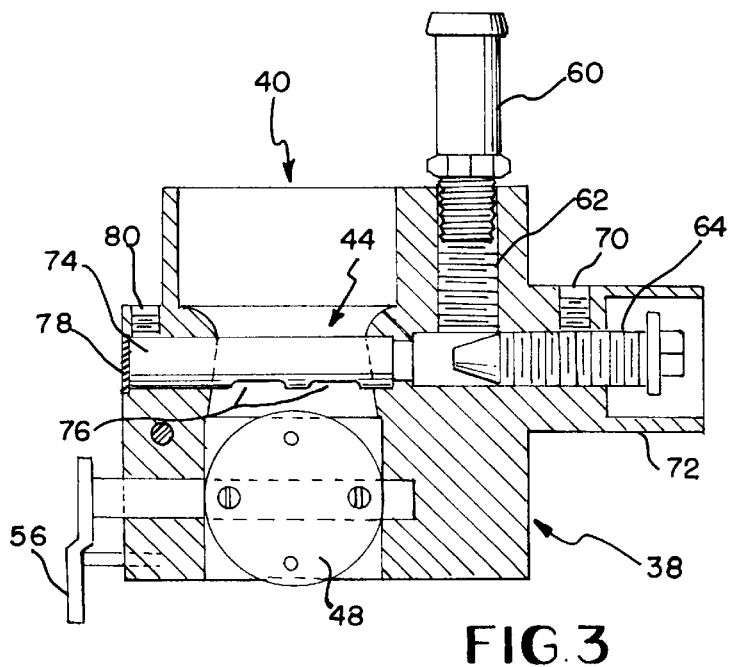

ENHANCED PERFORMANCE CARBURETOR SYSTEM

BACKGROUND OF THE INVENTION

1. Field of the Invention

This invention relates to a carburetor for an internal combustion engine and, more particularly, relates to a system for enhancing performance of a carburetor for an internal combustion engine that is specifically designed to use propane or other liquid petroleum gas as its fuel.

2. Description of Related Art

Pollution from the exhausts of internal combustion engines is a global problem, and much effort has been made to reduce it. Over the past several decades, automobile manufacturers and gasoline refiners have continuously improved their products, but, nonetheless, the problem continues. It is well known that liquid petroleum gasses, such as propane, significantly reduce the amount of harmful pollutants dumped into the atmosphere by internal combustion engines. Yet, to date, most automobiles, boats, and other pieces of equipment using internal combustion engines still use gasoline as their fuel. One of the reasons propane as a fuel is rarely used is that gasoline provides more usable power than propane when used in an internal combustion engine. Also, the usable output from a single tank of gasoline is greater than that provided by a tank of propane. It would be a step in the right direction to provide a propane-burning engine which reduces pollution while providing more power and efficiency than previously possible.

OBJECTS AND SUMMARY OF THE INVENTION

The primary object of the present invention is to overcome the difficulties described above by providing an improved propane carburetor which is designed to increase both horsepower and fuel economy while reducing emissions.

Another object of the present invention is to provide an improved propane carburetor for internal combustion engines which significantly increases usable power, significantly increases fuel efficiency, and significantly reduces air pollution.

It is a further object of the present invention to provide a propane-using internal combustion engine which competes with a gasoline-using engine in performance while significantly reducing air pollution.

The foregoing and other objects are achieved in accordance with one aspect of the present invention by the provision of a spud end fuel metering tube in an air-fuel mixing passage in a carburetor. More particularly, a fuel supplying spud end is located transversely across the venturi throat within the mixing chamber of the carburetor. The spud end includes fuel supply apertures that face downstream of the airflow therethrough.

In a preferred embodiment of the present invention, the apertures comprise a pair of linearly aligned, oval shaped apertures, while in an alternate embodiment, the apertures comprise three linearly aligned, circularly shaped apertures.

The present invention provides increased power and fuel economy over a wide range of RPMs and demand levels while substantially reducing undesirable pollutant emission levels. More particularly, tests of the inventive carburetor described herein have shown measurably improved fuel consumption levels, measurably improved engine performance, as evidenced in reduced thermal levels, reduced operating noise levels, reduced lubricating oil temperature levels, and measurably improved usable power, when compared with previously known propane-burning engines, while significantly reducing air pollution, when compared to gasoline engines.

In accordance with another aspect of the present invention, the propane carburetor is further provided with a butterfly valve which includes apertures formed therein for permitting airflow to continue through the carburetor when the butterfly valve closes, in order to provide a sufficient fuel supply to run the engine at idle. This eliminates the need for other downstream ports to supply and/or independently sustain fuel for idling.

BRIEF DESCRIPTION OF THE DRAWINGS

The foregoing and other objects, aspects, uses, and advantages of the present invention will be more fully appreciated as the same becomes better understood from the following detailed description of the present invention when viewed in conjunction with the accompanying drawings, in which:

FIG. 2 is a cross-sectional, partially exploded view of a propane carburetor incorporating a preferred embodiment of the present invention;

FIG. 3 is a cross-sectional view of the assembled carburetor of FIG. 2; and

FIG. 4 shows an alternate embodiment of the present invention.

DETAILED DESCRIPTION OF THE PREFERRED EMBODIMENTS

Figure 1:
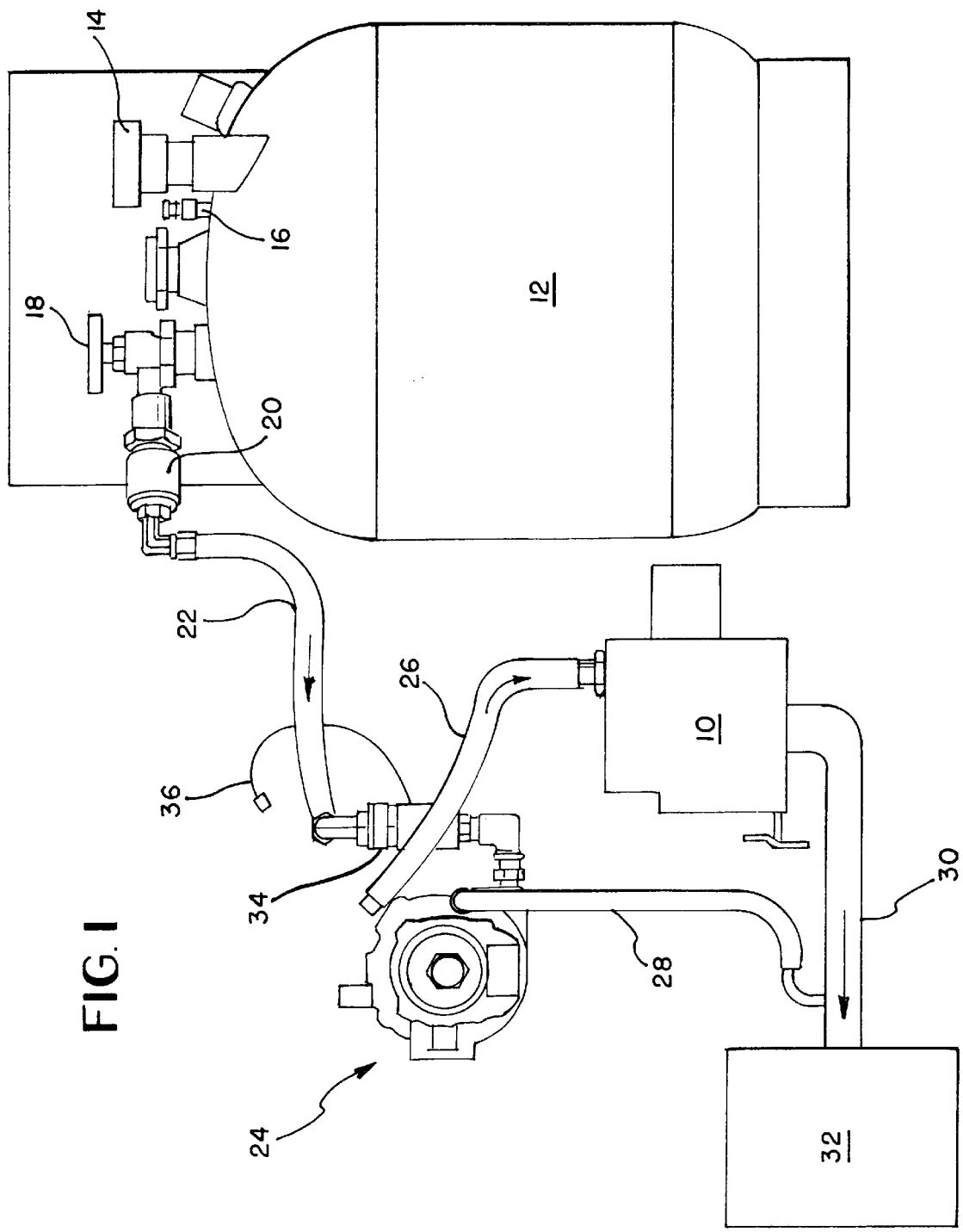
FIG. 1 is a diagrammatic representation of a preferred embodiment of the present invention in combination with an internal combustion engine.

Referring now to the drawings, wherein like reference numerals indicate identical or corresponding parts throughout the several views, and more particularly to FIG. 1, there is shown a carburetor 10 as it would be used in association with an internal combustion engine indicated by reference numeral 32.

A propane fuel tank 12 stores and supplies propane gas to carburetor 10. Tank 12 includes a safety fill port 14, a tank vent 16, a main cut-off valve 18, and a coupling 20. The latter joins tank 12 via a fuel line 22 to a fuel regulator indicated generally by reference numeral 24. Fuel regulator 24 regulates the volume and pressure of the fuel delivered to carburetor 10 through a fuel line 26 based on the vacuum signal received through a vacuum line 28 that is open to the intake manifold 30 of engine 32.

A fuel lockoff solenoid 34 stops fuel flow from tank 12 to fuel regulator 24 when engine 32 ceases to operate. Fuel lockoff solenoid 34 can be electrically operated, e.g., powered through a 12-volt power input cable 36, or can be vacuum operated, depending on the starting method used by engine 32.

Carburetor 10 is shown in cross-section in a partially exploded, partially sectional view in FIG. 2, and as assembled in FIG. 3, to both of which attention is now directed.

Carburetor 10 includes a body 38 that has an air-fuel mixing passage or chamber 40 extending vertically therethrough (it should be noted that such directional or positional terms as vertical, horizontal, upward, downward, right, left, etc., are used strictly for clarity in this description of the invention to denote the relative directions and positions as shown in the drawings and are not restrictive of the orientations of the corresponding elements as the carburetor may be used in practice). Mixing passage 40 comprises a cylindrical intake port 42, a venturi throat 44, and a cylindrical exhaust port 46.

As can be seen in FIG. 2, mixing passage 40 varies in diameter, the largest diameter being in intake port 42, the smallest diameter being in venturi throat 44, with exhaust port 46 having an intermediate diameter. More particularly, intake port 42 has a constant diameter throughout its axial extent and is adapted to be connected in any suitable manner to a source of air. Descending downwardly as viewed in FIG. 2, the diameter of venturi throat 44 is seen to smoothly converge from its juncture with intake port 42 to a minimum and then to gradually expand to mate with the constant diameter of exhaust port 46. Exhaust port 46 is connected in a known manner to engine intake manifold 30 (FIG. 1).

When an airstream is drawn through mixing passage 40, the airstream is initially compressed and accelerated by the convergence of venturi throat 44. As the airstream passes the minimum diameter in venturi throat 44, it expands at a varying rate into exhaust port 46.

In accordance with one aspect of the present invention, a butterfly throttle valve 48 comprises a thin plate having apertures 50, 58 therethrough. Apertures 50 are spaced to align with threaded apertures 52 in a throttle bar 54 to mount butterfly valve 48 thereon. A throttle linkage system indicated schematically by linkage 56 rotates throttle bar 54 to change the angular position of butterfly valve 48 to selectively control the closing of mixing passage 40, thereby controlling the volume of air fuel mixture passing through carburetor 10. Significantly, apertures 58 permit the air-fuel mixture to continue to flow through carburetor 10, when butterfly valve 48 closes off mixing passage 40, to provide a sufficient fuel supply to run the engine at idle. The provision of apertures 58 eliminates the usual need for some other downstream port for supplying and independently sustaining fuel for idling.

Fuel is supplied to carburetor 10 through fuel line 26 (FIG. 1) connected to a barbed connector 60 that is threadedly attached to a fuel input port 62. A fuel volume adjust screw 64 is threadedly engaged with carburetor body 38 and is adjusted to limit the maximum amount of fuel which can be supplied to carburetor 10. Fuel volume adjust screw 64 includes a tapered end 66 that extends into blocking relationship with fuel input port 62, as more clearly shown in FIG. 3, in order to provide for precision control of the fuel volume permitted to carburetor 10. Fuel volume adjust screw 64 is adjusted at the factory and is preferably provided with a tamper proof head 68 to prevent readjustment by anyone other than a trained technician. A set screw 70 is mounted transversely to fuel volume adjust screw 64 in body 38 to prevent migration of fuel volume adjust screw 64 due to normal vibrations. A recessed extension 72 of body 38 protects fuel volume adjust screw 64 from accidental displacement.

In accordance with another aspect of the present invention, a spud end 74 is provided which comprises a hollow tube, open at both ends, having a plurality of linearly arranged apertures 76 in its side wall. Apertures 76 are shown in FIG. 2 as facing outwardly from the plane of the drawing. This orientation is depicted solely to clearly show a preferred size, shape, and number of apertures which have been found to be particularly effective; when assembled, as shown in FIG. 3, apertures 76 face downstream in mixing chamber 40 toward butterfly valve 48. As viewed in FIG. 2, apertures 76 are closer to the right end than the left end of spud end 74, so that they will be centered across the diameter of venturi 44 when spud end 74 is assembled in carburetor 10 as shown in FIG. 3. A cap 78 closes the distal end of spud end 74, and a set screw 80 is positioned transversely to spud end 74 in body 38 so as to hold spud end 74 in place.

FIG. 3 shows the assembled carburetor. Fuel enters input port 62 and flows into the right end (as viewed in FIG. 3) of spud end 74. The airstream flowing past spud end 74 draws fuel out of apertures 76 into mixing passage 40 where the two mix.

Tests have shown that the placement of spud end 74 in the venturi throat with apertures 76 facing downstream is preferred. Placing spud end 74 in venturi throat 44 optimizes the mixing of air with the fuel, apparently due to the airstream expanding in that region. It was found that placement of spud end 74 upstream or downstream of venturi throat 44 disadvantageously resulted in an inability of the engine to climb in RPMs over the entire demand load range.

It was further found that orienting spud end 74 such that apertures 76 faced other than downstream (as shown in FIG. 3) also resulted in a decrease in engine performance. It was originally thought that injecting the fuel laterally into the airstream, in the manner taught by prior art injectors in the form of a circular ring around the narrowest portion of the venturi, or directing the fuel flow upwardly in opposition to the airstream flow, would provide a better mixture of fuel and air. Surprisingly, however, the engine's performance improved noticeably when apertures 76 were faced toward butterfly valve 48 as shown in FIG. 3.

The size and shape of apertures 76 are also important to optimizing engine performance. No general relationship has been identified as yet governing the size and shape of apertures 76, but fewer, larger apertures seem to work better. Two oval-shaped apertures 76, as shown in FIG. 2, are preferred, but the specific size and shape appears to be dependent on the specific engine to which carburetor 10 is affixed.

FIG. 4 shows an alternate embodiment of the spud end of the present invention which also works well. In FIG. 4, spud end 174 has three circular apertures 176. As before, when assembled in carburetor 10, apertures 176 should be centered across the diameter of venturi 44 and oriented downwardly towards the butterfly valve.

Obviously, numerous modifications and variations of the present invention are possible in light of the above teachings. It is therefore to be understood that within the scope of the appended claims, the invention may be practiced otherwise than as specifically described herein.

I claim as my invention:

1. Apparatus, comprising:

(a) a propane carburetor;

(b) means for providing propane fuel to said carburetor;

(c) means for providing an airflow through said carburetor;

(d) said carburetor including an air-fuel mixing chamber having an intake port for receiving said airflow, an exhaust port, and a venturi throat between said intake and exhaust ports; and (e) fuel metering means connected to receive and distribute said propane fuel, said fuel metering means comprising a hollow tube having a single row of apertures located in a sidewall thereof, said tube being positioned transversely across the entire venturi throat with the openings of said row of apertures facing downstream of said airflow.

2. The apparatus as set forth in claim 1, further comprising butterfly valve means located in said exhaust port for selectively controlling said airflow through same, said butterfly valve means including aperture means formed therein for permitting an associated engine to idle when said butterfly valve means closes.

3. The apparatus as set forth in claim 1, wherein said single row of apertures is centered across said venturi throat.

4. The apparatus as set forth in claim 1, wherein said single row of apertures comprises two oval-shaped apertures whose major axes are linearly aligned along said sidewall.

5. The apparatus as set forth in claim 4, wherein said single row of apertures is centered across said venturi throat.

6. The apparatus as set forth in claim 4, wherein said single row of apertures is parallel to the longitudinal axis of said tube.

7. The apparatus as set forth in claim 1, wherein said single row of apertures comprises three circularly-shaped apertures whose centers are linearly aligned along said sidewall.

8. The apparatus as set forth in claim 7, wherein said single row of apertures is centered across said venturi throat.

9. The apparatus as set forth in claim 7, wherein said single row of apertures is parallel to the longitudinal axis of said tube.

10. In combination with a propane carburetor which includes means for receiving propane fuel, an air-fuel mixing chamber having an intake port for receiving airflow, an exhaust port, and a venturi throat between said intake and exhaust ports, the improvement of which comprises:

fuel metering means connected to receive and distribute said propane fuel, said fuel metering means comprising a hollow tube having a plurality of apertures linearly aligned along a sidewall thereof, said tube being positioned transversely across the entire venturi throat with the openings of said plurality of apertures facing downstream of said airflow.

11. The improvement as set forth in claim 10, further comprising butterfly valve means located in said exhaust port for selectively controlling said airflow through same, said butterfly valve means including aperture means formed therein for permitting an associated engine to idle when said butterfly valve means closes.

12. The improvement as set forth in claim 10, wherein said plurality of apertures consists of two oval-shaped apertures whose major axes are linearly aligned along said sidewall.

13. The improvement as set forth in claim 12, wherein said plurality of apertures are parallel to the longitudinal axis of said tube.

14. The apparatus as set forth in claim 12, wherein said plurality of apertures are centered across said venturi throat.

15. The improvement as set forth in claim 10, wherein said plurality of apertures consist of three circularly-shaped apertures whose centers are linearly aligned along said sidewall.

16. The improvement as set forth in claim 15, wherein said plurality of apertures are parallel to the longitudinal axis of said tube.

17. The improvement as set forth in claim 15, wherein said plurality of apertures are centered across said venturi throat.

18. A propane carburetor, comprising:

a body;

an air-fuel mixing chamber extending through said body;

said air-fuel mixing chamber including an intake port for receiving airflow, an exhaust port, and a venturi throat between said intake and exhaust ports; and fuel metering means for receiving and distributing propane fuel, said fuel metering means comprising a hollow tube having a plurality of apertures linearly aligned along a line parallel to the axis of said tube, said tube being positioned transversely across the entire venturi throat with the openings of said plurality of apertures facing downstream of said airflow.

19. The propane carburetor as set forth in claim 18, wherein said plurality of apertures consist of two oval-shaped apertures whose major axes are linearly aligned along said sidewall.

20. The propane carburetor as set forth in claim 19, wherein said single row of apertures are centered across said venturi throat.

21. The propane carburetor as set forth in claim 18, wherein said plurality of apertures consist of three circularly-shaped apertures whose centers are linearly aligned along said sidewall.

22. The propane carburetor as set forth in claim 21, wherein said plurality of apertures are centered across said venturi throat.

23. The propane carburetor as set forth in claim 18, further comprising butterfly valve means located in said exhaust port for selectively controlling said airflow through same, said butterfly valve means including aperture means formed therein for permitting an associated engine to idle when butterfly valve means closes.

* * * * *